(12) United States Patent
Szuba et al.

(10) Patent No.: US 8,215,880 B2
(45) Date of Patent: Jul. 10, 2012

(54) SERVO MOTOR FOR ACTUATING A MANDREL WHILE EXTRUDING HELICAL TEETH

(75) Inventors: Joseph A. Szuba, Dearborn, MI (US); Emilo A. Tonello, Highland, MI (US); Michael A. Cook, Livonia, MI (US); Rodney G. Whitbeck, Northville, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 950 days.

(21) Appl. No.: 12/245,105

(22) Filed: Oct. 3, 2008

(65) Prior Publication Data

US 2010/0083503 A1 Apr. 8, 2010

(51) Int. Cl.
*B23B 9/00* (2006.01)
(52) U.S. Cl. ... 408/3; 29/893.34; 29/893.35; 29/893.36; 72/264; 72/343
(58) Field of Classification Search ............... 29/893.34, 29/893.35, 893.36; 72/264, 343; 408/3
See application file for complete search history.

(56) References Cited

U.S. PATENT DOCUMENTS

| | | | |
|---|---|---|---|
| 4,692,071 A | 9/1987 | Hirota | |
| 4,770,572 A | 9/1988 | Ohkawa et al. | |
| 4,772,368 A | 9/1988 | Rabian | |
| 4,924,690 A * | 5/1990 | Kanamaru et al. | 72/343 |
| 5,465,597 A | 11/1995 | Bajraszewski et al. | |
| 5,538,369 A | 7/1996 | Okuda | |
| 5,551,270 A | 9/1996 | Bajraszewski et al. | |
| 5,732,586 A * | 3/1998 | Muessig et al. | 72/267 |
| 6,204,466 B1 | 3/2001 | Tabor | |
| 8,061,174 B2 * | 11/2011 | Szuba et al. | 72/267 |
| 2010/0083503 A1 * | 4/2010 | Szuba et al. | 29/893.34 |

* cited by examiner

*Primary Examiner* — Carl Arbes
(74) *Attorney, Agent, or Firm* — Raymond Coppiellie MacMillan, Sobanski & Todd, LLC

(57) ABSTRACT

An apparatus for extruding helical teeth in a gear blank includes a press including a die plate and a die base, the die plate being movable along an axis relative to the die base, the die base supporting the gear blank. A mandrel, aligned with the axis and moveable with the die plate along the axis, includes a surface that includes helical die teeth. A servo motor drives the mandrel in rotation about the axis to the required helix angle as the mandrel moves axially relative to the gear blank.

10 Claims, 2 Drawing Sheets

SERVO MOTOR FOR ACTUATING A MANDREL WHILE EXTRUDING HELICAL TEETH

BACKGROUND OF THE INVENTION

1. Field of the Invention

This invention relates generally to forming spline teeth or gear teeth, and more particularly to cold extruding helical teeth in a gear blank workpiece.

2. Description of the Prior Art

Planetary gear units of the type used in automotive transmissions include ring gears having internal helical teeth rather than straight gears even though helical gear teeth are more difficult to form. The internal gear teeth must be formed with very precise dimensions and spacing in order to perform correctly.

The helical teeth may be formed by broaching, which is a cutting process in which a large broaching bar with cutting teeth is pulled through a gear blank to form the teeth. Broaching is a costly process, which requires a significant investment in dedicated machinery, lead bar, cutting tools and cutting oils. Broaching can only be applied to parts accessible in both axial directions since the long broach bar must be pulled through the inside of a gear blank to cut the teeth.

The helical teeth may be formed by gear shaping, another cutting process used to fabricate internal helical teeth. Although it is a slower process than broaching, it can be used to form blind end as well as through parts for high volume production. Even so, this process also requires an investment in expensive machinery and cutting tools.

Helical teeth may be formed by cold extrusion, in which the teeth are formed, rather than cut, into the part. A precision ground, hardened mandrel formed with external helical die teeth is forced into a workpiece, whose internal surface is formed with the negative contour of the die teeth. When helical teeth are being extruded, the mandrel must be guided in a helical path through the workpiece. This guidance combines axial translation and rotation about a central axis.

According to conventional practice, extrusion of helical ring gears requires a specific helical lead guide as part of each tool set to produce gear teeth at the proper helical angle. The lead guide is an expensive, large element of the die set and must be machined to precise dimensions. The lead mechanism requires a significant portion of the vertical dimension of the die set, and increases the total size of the hydraulic press. A lead guide and broach bar must be held in inventory for each product being made.

A need exists in the metal forming industry for an efficient, reliable technique for extruding internal and external helical gear teeth without using a lead guide to control the helical path of the mandrel through the material of the workpiece.

SUMMARY OF THE INVENTION

An apparatus for extruding helical teeth in a gear blank includes a press including a die plate and a die base, the die plate being movable along an axis relative to the die base, the die base supporting the gear blank. A mandrel, aligned with the axis and moveable with the die plate along the axis, includes a surface that includes helical die teeth. A motor of a programmed servo mechanism drives the mandrel in rotation about the axis as the mandrel moves axially relative to the gear blank, creating a helical path.

The servo motor and controller provides several advantages specific to the process of extruding helical gears including smaller size requires less die opening height; faster cycle time in extruding each gear, functional flexibility by programming the controller to control gear extrusion with many different helical gears and helix angles; fast die changing between different products, sensors for monitoring the extrusion process; and reduced the cost of the extrusion tooling and the hydraulic press.

The servo motor can be programmed to assist in the extrusion process by generating rotational torques while the hydraulic press actuates in the downward direction permitting better control of forces required to produce precision formed gear tooth profiles.

Moreover, the lead guide is replaced with a computer controlled electronic or hydraulic servo mechanism, which provides proper rotation of the mandrel to impart the exact helical gear geometry required for the gear being processed. The servo mechanism is much smaller than the fixed lead guide and is programmable for many different helical gear lead angles.

The servo controls are linked to a computer which controls axial movement and radial forces of the mandrel, thereby coordinating the press actuation sequence with the rotation and eliminating need for the mechanical lead guide.

The scope of applicability of the preferred embodiment will become apparent from the following detailed description, claims and drawings. It should be understood, that the description and specific examples, although indicating preferred embodiments of the invention, are given by way of illustration only. Various changes and modifications to the described embodiments and examples will become apparent to those skilled in the art.

DESCRIPTION OF THE DRAWINGS

The invention will be more readily understood by reference to the following description, taken with the accompanying drawings, in which.

DESCRIPTION OF THE PREFERRED EMBODIMENT

Figure 1:
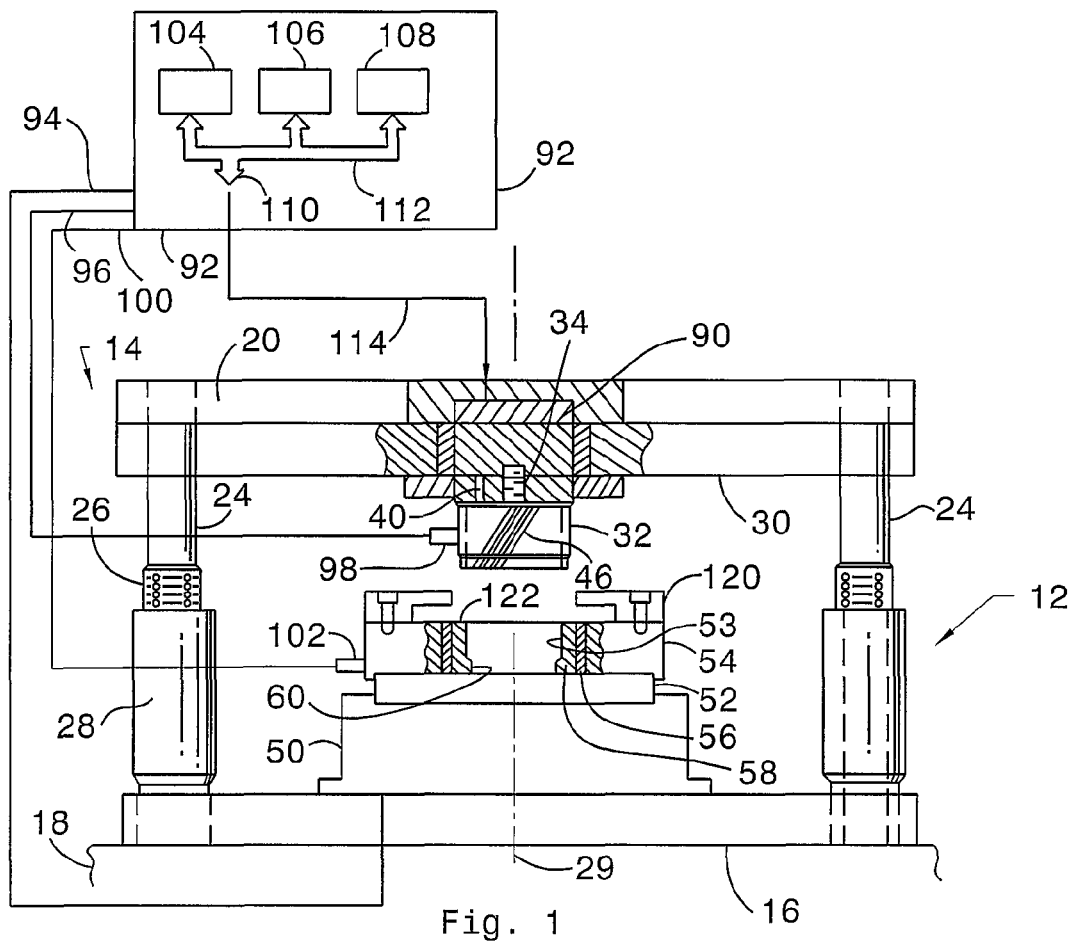
FIG. 1 is a front view of an extrusion press equipped with a servo motor for forming internal helical gear teeth on a gear blank.
Figure 2:
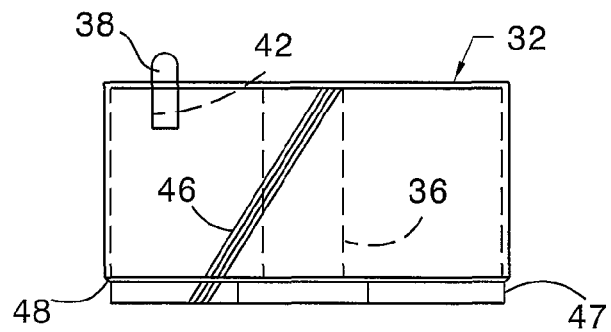
FIG. 2 is front view of a mandrel used in the extrusion press of FIG. 1.

Referring first to FIGS. 1 and 2, an extrusion die assembly 12, mounted in a hydraulic press 14, includes a lower die plate 16, resting on a base portion 18 of the press 14, and an upper die plate 20. Die guide posts 24 extend between upper die plate 20 and lower die plate 16. One end of each die guide post 24 is fixed to upper die plate 20; the opposite end of each die guide post 24 has a ball bearing cage 26 attached to it. Affixed to lower die plate 16 are guide bushings 28, with each guide bushing 28 aligned with one ball bearing cage 26. Ball bearing cages 26 telescopically slide into their respective guide bushings 28 to allow axial movement of upper die plate 20 relative to lower die plate 16, minimizing friction and maintaining the two die plates 16, 20 mutually parallel. The assembly 12 is concentric with and translates along an axis 29.

A support plate 30, guided on the guide posts 24, is secured to the upper die plate 20 for movement with plate 20 along axis 29. A mandrel 32 is fastened to support plate 30 by a bolt 34, which slips through a bore 36 in the center of mandrel 32 and engages a tapped screw thread in support plate 30. Dowels 38 mate both with dowel holes 40 in support plate 30 and corresponding dowel holes 42 in mandrel 32. Mandrel 32 is formed with external die teeth 46, a lead surface 47, and a single step 48, which is preferred to a multiple-step mandrel. The helix angle of die teeth 46 is the same as that desired in the gear to be formed from the workpiece.

A load cell 50, mounted on lower die plate 16, includes force sensors mounted within it and electrically connected to a controller. Load cell 50 senses the magnitude of load and torque applied to it during the forming operation. To control the forming process, force sensors are used to control both the downward press motion and the rotational torque provided by the servo mechanism. If the load is out of predetermined ranges of these parameters, then the press 14 will stop the forming operation so that the press equipment can be checked. Load cell 50 is optional, and the extrusion process can be conducted without this piece of equipment, if so desired.

Mounted on load cell 50 is a die base 52. A retainer ring 54, mounted on die base 50, has a cylindrical central cavity. A hardened sleeve insert 56, fitted within the retainer ring 54, surrounds the workpiece gear blank 58. The die base 50 supports the gear blank 58 axially during the forming process. Retainer ring 54, sleeve insert 56 and gear blank 58 are located concentric with axis 29 and mandrel 32. The gear blank 58 is formed with a cylindrical central cavity 53 that is aligned with axis 29.

A gear blank 58 includes an annular, cylindrical surface of controlled diameter, in which the internal helical gear teeth will be extruded during the forming process. FIG. 1 shows a ring gear blank 58 inserted into sleeve insert 56.

A servo motor 90 is secured to upper die plate 20, faces mandrel 32, and has its shaft driveably connected to the mandrel, such that the armature of the servo motor and the mandrel rotate about axis 29 as a unit in response to control signals produced by a controller 92.

Electronic signals 94, produced by load cell 50 and representing the magnitude of the extrusion force and torque and the speed of press 14 are supplied to controller 92 as input. Electronic signals 96 produced by sensors 98 representing the angular displacement of mandrel 32 and the rotor of servo motor 90 from a reference position about axis 29, and the speed of motor 90 are supplied to controller 92 as input. Electronic signals 100 produced by sensor 102 representing the angular displacement of workpiece 58 from a reference position about axis 29 are also supplied to controller 92 as input.

Controller 92 preferably includes an electronic microprocessor 104, electronic memory 106, and signal conditioning circuits, which communicate mutually and with an output 110 over a data bus 112. The memory contains a control algorithm, which is executed using variables represented by the input signals and is programmed to produce many different helical gear lead angles and continually adjusts to deviation from expected behavior of the press 14.

Control signals 114 are carried from the output 110 of controller 92 to a servo motor control (not shown), which actuates servo motor 90 to rotate about axis 29 in response to the control signals output by controller 29. Similarly, controller 92 causes the assembly 12 to translate vertically along axis 29.

The extrusion assembly 12 is used in a cold extrusion process for forming internal helical teeth in gear blanks 58, with tight control of lead accuracy.

In operation, a gear blank 58 is inserted into ring insert 56. Hydraulic press 14 is activated and forces the upper die plate 20 downward toward lower die plate 16, guided by die guide posts 24.

This axial translation carries mandrel 32 toward gear blank 58 such that the lead surface 47 enters the central opening 53 in the workpiece 58. Servo motor 90 causes mandrel 32 to rotate about axis 29 to a desired angular position, at which the helical die teeth 46 on the external surface of mandrel 32 first contact the gear blank workpiece 58. When the mandrel 32 is in its desired angular position, hydraulic press 14 is actuated to continue its axial path and servo motor 90 is actuated to rotate at a speed that is related to the speed of its axial path such that the internal gear teeth are formed on the workpiece 58 with the desired helix angle.

Die teeth 46 on mandrel 32 engage the inner surface of gear blank 58 and move downward into the material of the workpiece with a helical motion as they are forced into the gear blank, thereby forming helical gear teeth. When the predetermined depth of finished gear teeth is reached, hydraulic press 14 stops pressing on upper die plate 20 and retracts the upper die plate 20 and mandrel 32. Servo radial forces are used to form the gear tooth flanks during the upper stroke of the press and die.

This movement causes mandrel 32 to withdrawal upward and to lift the workpiece 58 from the surface of the die base 50. A box stripper 120, secured to the die base 50, contacts the upper surface 122 of the workpiece 58 forcing it from the mandrel 32 and allowing the mandrel to withdraw from the extruded gear. The motion of withdrawal will follow that of insertion.

The finished ring gear is then removed from press 14 and another gear blank 58 is inserted in its place preparatory to repeating the forming process. Because the travel distance of the press 14 is short, the length of the cycle period is short time and throughput is increased substantially over conventional techniques.

Figure 3:
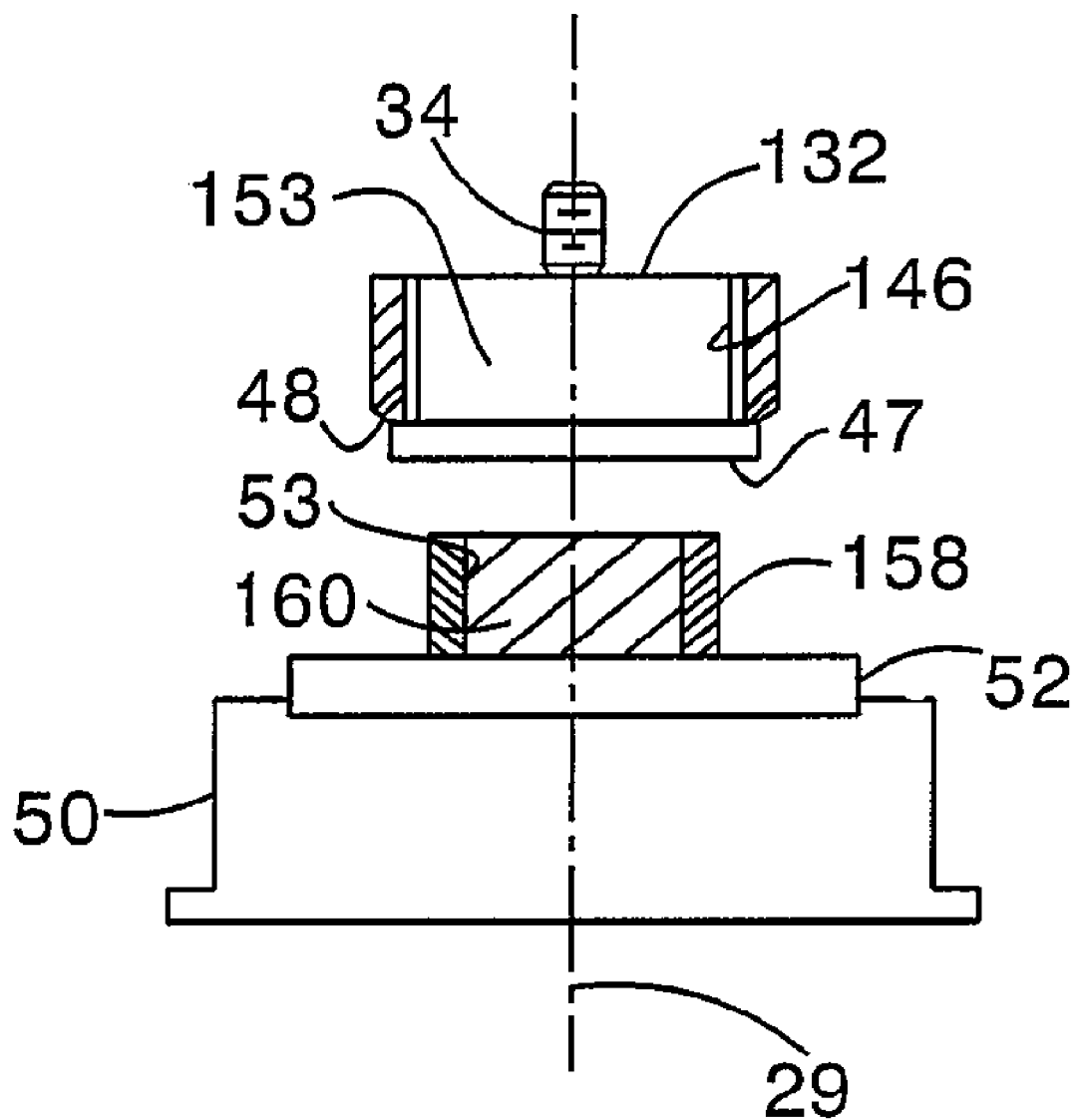
FIG. 3 is front view of a mandrel and die base used to form external helical gear teeth in a gear blank.

Although the extrusion method has been described with reference to external helical mandrel teeth 46 on the workpiece 58 being used to extrude internal teeth on the blank 58, if external helical gear teeth are to be extruded on a workpiece 158, as FIG. 3 illustrates, a mandrel 132 is formed with a central cylindrical cavity 153, which surrounds the outer surface of the workpiece 158 and is aligned with axis 29. The inner surface of workpiece 158 is supported by a cylindrical plug 160 located in the cylindrical cavity 53 of the workpiece. The inner surface of mandrel 132 is formed with helical die teeth 146. The servo motor 90 is driveably connected to mandrel 132 and rotates the mandrel as the press 14 forces the die teeth 146 axially into and through the wall of the workpiece 158, thus forming external helical gear teeth on the outer surface of the workpiece or gear blank 158.

In accordance with the provisions of the patent statutes, the preferred embodiment has been described. However, it should be noted that the alternate embodiments can be practiced otherwise than as specifically illustrated and described.

The invention claimed is:

1. An apparatus for extrusion forming helical teeth in a gear blank comprising:
    a die base for supporting the gear blank;
    a press that moves along an axis relative to the die base;
    a mandrel aligned with the axis, moveable with the press along the axis, and including a surface that includes helical die teeth; and
    a servo motor driveably coupled to the mandrel for rotating the mandrel about the axis in a first rotary direction as the mandrel moves axially relative to gear blank, stopping axial movement of the mandrel, rotating the mandrel in a second rotary direction opposite the first direction and removing the mandrel from the gear blank.

2. The apparatus of claim 1 wherein the helical die teeth are located on an external surface of the mandrel; and
   the apparatus further comprises a ring supported on the die base and having a cavity concentric with the axis and able to receive the gear blank therein.

3. The apparatus of claim 1 wherein:
   the helical die teeth are located on an internal surface of the mandrel;
   the gear blank has a cavity concentric with the axis; and
   the apparatus further comprises a die supported on the die base and located in the cavity of the gear blank.

4. The apparatus of claim 1 wherein the helical die teeth are located on an external surface of the mandrel; and
   the apparatus further comprises:
   a ring supported on the die base having a cavity concentric with the axis and able to receive the gear blank therein; and
   a stripper secured against movement and located for contact with the gear blank and to separate the gear blank from the mandrel after the helical die teeth are extruded in the gear blank.

5. The apparatus of claim 1 further comprising:
   a controller configured to control rotation of the mandrel and the servo motor, to control axial movement of the mandrel into the gear blank, to coordinate said rotation and said translation such that the mandrel extrudes the helical die teeth in the gear blank having a desired helix angle.

6. A method for extruding helical teeth in a gear blank comprising the steps of:
   (a) providing a press that moves along an axis and includes a die base that supports the gear blank against said axial movement of the press;
   (b) providing a mandrel that is aligned with the axis and moveable by the press along the axis, and includes a surface formed with helical die teeth;
   (c) placing the gear blank on the die base;
   (d) using the press to extrude the die teeth in the gear blank by moving the mandrel along the axis and forcing the mandrel into material of the gear blank; and
   (e) using a servo motor that is driveably coupled to the mandrel for rotation about the axis to extrude the die teeth in the gear blank by rotating the mandrel about the axis in a first rotary direction as the mandrel is forced axially into the material of the gear blank, to stop axial movement of the mandrel in the gear blank, to use the press to pull the mandrel axially out of the extruded gear blank and to rotate the mandrel in a second rotary direction opposite the first direction and to remove the mandrel from the gear blank.

7. The method of claim 6 further including the steps of:
   using a stripper to contact the extruded gear blank; and
   removing the extruded gear blank from the mandrel due to said contact.

8. The method of claim 6 further including the step of:
   using a controller to coordinate rotation of the servo motor and mandrel about the axis and movement of the press and mandrel while extruding the die teeth in the gear blank.

9. The method of claim 6 wherein:
   step (b) further include the step of forming helical die teeth on an outer surface of the gear blank; and
   steps (d) and (e) further include the step of using the press and the servo motor to extrude the helical teeth on an inner surface of the gear blank.

10. The method of claim 6 wherein:
   step (b) further include the step of forming helical die teeth on an inner surface of the gear blank; and
   steps (d) and (e) further include the step of using the press and the servo motor to extrude the helical teeth on an outer surface of the gear blank.

* * * * *